(12) United States Patent
MacLean et al.

(10) Patent No.: US 7,885,186 B2
(45) Date of Patent: Feb. 8, 2011

(54) SYSTEM AND METHOD OF ADAPTIVELY MANAGING BANDWIDTH ON OPTICAL LINKS SHARED BY MULTIPLE-SERVICES USING VIRTUAL CONCATENATION AND LINK CAPACITY ADJUSTMENT SCHEMES

(75) Inventors: Mark D. MacLean, Nepean (CA); Stephen C. Lewis, Kanata (CA)

(73) Assignee: Ciena Corporation, Linthicum, MD (US)

( * ) Notice: Subject to any disclaimer, the term of this patent is extended or adjusted under 35 U.S.C. 154(b) by 2077 days.

(21) Appl. No.: 10/678,807

(22) Filed: Oct. 3, 2003

(65) Prior Publication Data

US 2005/0073955 A1 Apr. 7, 2005

(51) Int. Cl.
*G01R 31/08* (2006.01)

(52) U.S. Cl. .................... 370/230.1; 370/232; 370/437; 370/468; 398/45

(58) Field of Classification Search .................. 370/235
See application file for complete search history.

(56) References Cited

U.S. PATENT DOCUMENTS

| | | | | |
|---|---|---|---|---|
| 5,745,837 A | * | 4/1998 | Fuhrmann | 725/114 |
| 6,144,636 A | * | 11/2000 | Aimoto et al. | 370/229 |
| 6,222,848 B1 | | 4/2001 | Hayward et al. | |
| 6,498,782 B1 | * | 12/2002 | Branstad et al. | 370/231 |
| 6,697,373 B1 | * | 2/2004 | Sandstrom | 370/405 |
| 2001/0030785 A1 | * | 10/2001 | Pangrac et al. | 359/125 |
| 2003/0115282 A1 | * | 6/2003 | Rose | 709/214 |
| 2004/0057453 A1 | * | 3/2004 | Montgomery, Jr. | 370/452 |
| 2004/0179518 A1 | * | 9/2004 | Bruckman et al. | 370/358 |

* cited by examiner

*Primary Examiner*—Seema S Rao
*Assistant Examiner*—Sai-Ming Chan
(74) *Attorney, Agent, or Firm*—Christopher & Weisberg, P.A.

(57) ABSTRACT

Described are a system and method of adaptively managing bandwidth between services contending for the bandwidth on an optical link. Bandwidth is allocated to each service contending for bandwidth of the optical link. For each service, a current utilization metric representing a measure of current usage of the allocated bandwidth by that service is computed. Additional bandwidth is allocated to one of the services in response to the current utilization metric of that service if bandwidth usage of the optical link is currently at less than full capacity, otherwise the bandwidth allocation between the services is balanced in response to the current utilization metric of at least one of the services if the bandwidth usage of the optical link is currently at full capacity.

17 Claims, 3 Drawing Sheets

SYSTEM AND METHOD OF ADAPTIVELY MANAGING BANDWIDTH ON OPTICAL LINKS SHARED BY MULTIPLE-SERVICES USING VIRTUAL CONCATENATION AND LINK CAPACITY ADJUSTMENT SCHEMES

FIELD OF THE INVENTION

The invention relates generally to optical telecommunications systems. More particularly, the invention relates to a system and method of adaptively managing bandwidth on optical links shared by multiple services using virtual concatenation and link capacity adjustment schemes.

BACKGROUND

The standard for optical transport of telecommunications in North America is Synchronous Optical Network or SONET and its European variant is Synchronous Digital Hierarchy or SDH. The SONET and SDH standards specify a pre-defined hierarchy of synchronous payloads. However, the data rates needed by some services, such as asynchronous transfer mode (ATM) and Packet-over-SONET, exceed the capacity of the specified payloads. To accommodate high-speed data applications industry devised contiguous concatenation, which joins containers together to form a single structure that provides a higher data rate. Contiguous concatenation has some deficiencies, however, including an inability to efficiently accommodate finer granularity of payloads for some services. For example, a Gigabit Ethernet service (1000 Mbps) is traditionally transported over a SONET network using the nearest contiguous concatenation group size (i.e., OC-48c, which supports 2400 Mbps). Accordingly, nearly 60% of the bandwidth is wasted.

Virtual concatenation (VCAT) provides a mechanism for reducing bandwidth waste by producing appropriately sized pipes over the SONET network. VCAT divides the bandwidth into individual payload containers (e.g., STS-1 units). The individual containers are logically represented as members of the same virtual concatenation group or VCG. Members of a VCG are transported individually across the network to the destination, typically by way of different routes. The destination recombines the VCG members into a continuous bandwidth.

Bandwidth demands can fluctuate over the course of a day. For example, the need for increased bandwidth can arise in the evenings, during the early morning hours, and on weekends when enterprises often perform data backups over the network. To handle these demand fluctuations, a customer would prefer to purchase bandwidth sufficient to cover its daytime activity that increases to cover the demands of the evening. VCAT alone, however, cannot provide dynamic bandwidth allocation.

To achieve dynamic bandwidth allocation, industry devised Link Capacity Adjustment Schemes or LCAS to be used with VCAT. With LCAS, bandwidth allocated to service traffic over an optical link can be changed at any time without disrupting the traffic on the link. Using a two-way handshaking signaling protocol, LCAS can incrementally add and remove bandwidth capability within a VCG, without affecting the service or disabling the entire VCG. Service providers are thus able to supply bandwidth more closely in accordance with the customers' dynamically changing bandwidth needs. However, the combination of VCAT and LCAS technologies by itself does not enable service providers to prioritize and allocate bandwidth between services contending for use of a common link. There remains, therefore, a need for a system and method that can adaptively manage bandwidth on optical links shared by multiple services.

SUMMARY

In one aspect, the invention features a method of adaptively managing bandwidth among a plurality of services contending for bandwidth on an optical link having a bandwidth capacity. Bandwidth is allocated to each service contending for bandwidth of the optical link. For each service, a current utilization metric is computed representing a measure of current usage of the allocated bandwidth by that service. Additional bandwidth is allocated to one of the services in response to the current utilization metric of that service if bandwidth usage of the optical link is currently at less than full capacity. Otherwise, the bandwidth allocation is balanced between the services in response to the current utilization metric of at least one of the services if the bandwidth usage of the optical link is currently at full capacity.

In another aspect, the invention features a method of adaptively managing bandwidth among a plurality of services contending for bandwidth on an optical link having a bandwidth capacity. Bandwidth is allocated to each service contending for bandwidth on the optical link. For each service, a current utilization metric is determined representing a current usage by that service of the bandwidth allocated to that service. The bandwidth allocation is balanced between the services if the current utilization metric of at least one of the services exceeds a specified threshold and usage of the bandwidth of the optical link is currently at full capacity.

In yet another aspect, the invention features a network comprising a plurality of network elements connected to each other by optical links. A first path extends through the network over at least one of the optical links and is for carrying traffic associated with a first service through the network. A second path extends through the network over at least one of the optical links and is for carrying traffic associated with a second service. The second path has a link in common with the first path. A first one of the network elements allocates a portion of the bandwidth of the common link to the first service and a second one of the network elements allocates a portion of the bandwidth of the common link to the second service. Each of the first and second network elements determine for the first and second services, respectively, a current utilization metric representing a current usage by that service of the bandwidth allocated to that service. The first and second network elements balance the bandwidth allocated to the services if the current utilization metric of at least one of the services exceeds a specified threshold and usage of the bandwidth of the common link is currently at full capacity.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The present invention features a system and method of adaptively managing bandwidth between services contending for bandwidth on an optical link in a network. With use of the invention, a service provider can dynamically modify the bandwidth allocated to each of the services, e.g., to satisfy peak demand of one service with the unused bandwidth of another service. When bandwidth usage of the optical link is at less than full capacity, the invention allocates additional bandwidth to those services satisfying certain criteria (e.g., exceeds a current utilization threshold). When usage of the optical link is at capacity, the invention operates to balance the available bandwidth according to priorities provisioned by a user or service provider. The invention exploits virtual concatenation technology to produce appropriately sized pipes for mapping services, such as Gigabit Ethernet, to SONET and Link Capacity Adjustment Schemes or LCAS technology to incrementally add and remove bandwidth capability from a service. Although the description of the invention refers primarily to Gigabit Ethernet services, the invention applies also to other types of services including, but not limited to, Fiber Channel, Fast Ethernet, video streaming applications.

Figure 1:
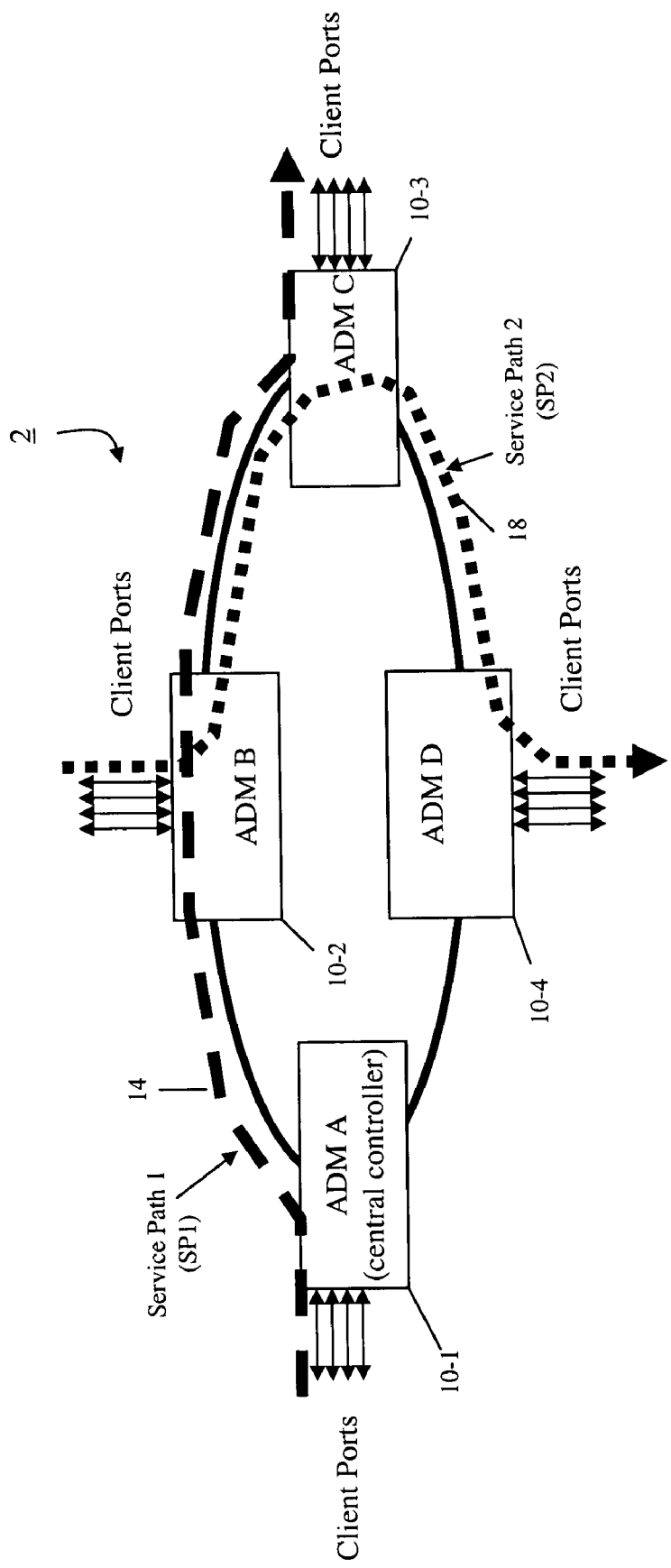
FIG. 1 is a block diagram of an embodiment of a network constructed in accordance with the principles of the invention.

FIG. 1 shows an embodiment of an optical communications network 2 constructed in accordance with the principles of the invention. The network 2 includes a plurality of network elements 10-1, 10-2, 10-3, 10-4 (generally, NE 10) arranged in a ring network topology. In the embodiment, each NE 10 is an add/drop multiplexer (ADM). Although the following description uses a ring network to illustrate the principles of the invention, the invention can be practiced in other network types, such as linear point-to-point, linear add/drop multiplexer (ADM), and mesh networks. Also, to simplify the description of the invention, the ring network is unidirectional; that is, the traffic flows in one direction around the ring (here, clockwise). As described further below, bi-directional rings can also practice the invention. Also, although described with respect to SONET, the invention can be implemented over other transport layers (e.g., SDH and Optical Transport Network (OTN).

As shown, each NE 10 is connected to a plurality of client ports for exchanging service-based traffic with a user network (not shown). Each NE 10 is also connected to its adjacent NEs by optical fiber. Only one fiber between each pair of adjacent NEs 10 is shown to simplify the description of the invention. It is to be understood that a ring network with multiple fibers (e.g., two, four) between adjacent NEs, for supporting protections mechanisms, bi-directional traffic flow or both, can be used to practice the invention. Each NE 10 is capable of performing VCAT and LCAS to transport the services over the links and to perform the adaptive bandwidth management of the invention. One of the NEs 10 (here, NE 10-1) is designated a central controller for the implementation of adaptive bandwidth management, as described further below.

Two particular circuits or paths for carrying service traffic through the network 2 are shown. A first path, referred to as service path 1 or SP1, enters the ring network 2 at the NE 10-1, traverses the NE 10-2, and exits the ring network 2 at the NE 10-3. A dashed line 14 represents the first path SP1. A second path, referred to as service path 2 or SP2, enters the ring network 2 at the NE 10-2, traverses the NE 10-3, and exits the ring network 2 at NE 10-4. The dotted line 18 represents the second path SP2. In one embodiment, the service traffic traversing the paths SP1 and SP2 are associated with Gigabit Ethernet services. With the use of the VCAT technology, Gigabit Ethernet signals are mapped to STS-1 signals and transported over each path SP1 and SP2 using appropriately sized pipes. In one embodiment, the STS-1 is the base unit of granularity employed by the adaptive bandwidth management of the invention to enable the use of the LCAS technology for incrementally added or removing bandwidth from these pipes. It is to be understood that the principles of the invention can apply to finer units of granularity than STS-1, provided there is a technology capable of incrementally adding and removing bandwidth at that finer granularity.

In one embodiment, the ring speed of the network 2 is OC-48. (Other speeds e.g., OC-192, can be used to practice the invention.) For this embodiment, each fiber span between adjacent NEs, hereafter referred to as a link, supports a bandwidth of 48 synchronous transport signals (STS-1s). Also, the link 22 between NEs 10-2 and 10-3 is shared by service traffic (called service S1) traversing over the first path SP1 and service traffic (called service S2) traversing over the second path SP2. In accordance with the principles of the invention, the services contend for the bandwidth of the link 22. Although this description refers to adaptively managing two services on a single link, it is to be understood that the principles of the invention extend also to adaptively managing bandwidth among three or more services sharing a contended link, and to concurrently managing bandwidth on multiple contended links in the network.

Figure 2:
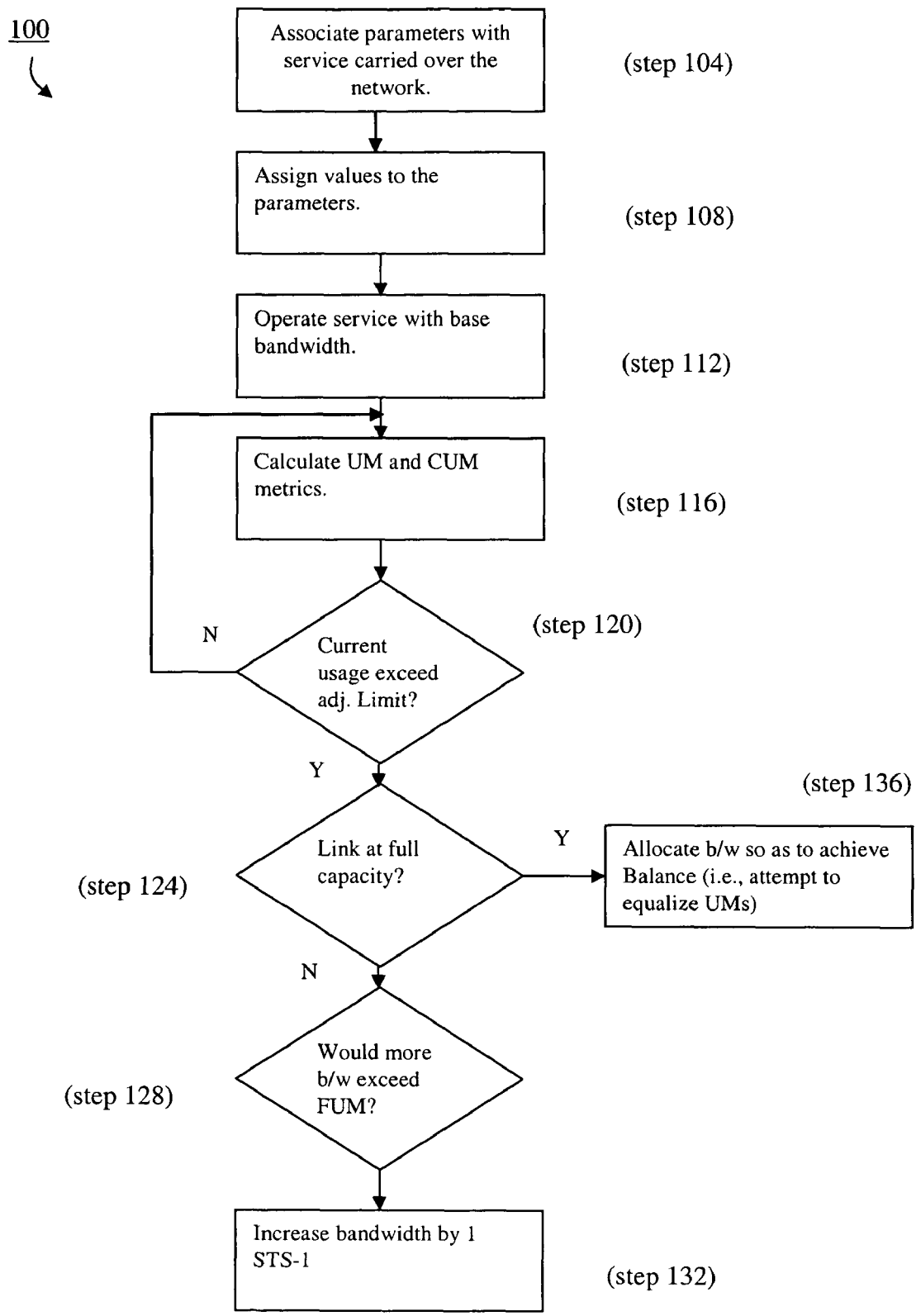
FIG. 2 is a flow diagram of an embodiment of a process for adaptively managing bandwidth between multiple services sending traffic over a link, in accordance with the invention.

FIG. 2 shows an embodiment of a process 100 for adaptively managing bandwidth allocation between services sending traffic over a contended link in accordance with the invention. In general, the process 100 involves associating (step 104) a plurality of parameters with each service carried over the network 2. Values assigned to these parameters control the manner or policy by which bandwidth is allocated to each service for transmitting service traffic between the endpoints of that service. A user assigns (step 108) values to the parameters when provisioning the service at the NE 10 where the service enters the ring network 2 (i.e., the entry endpoint of the service). For example, the parameter values are assigned for the service S1 at the NE 10-1, and for the service S2 the parameters are assigned at the NE 10-2. The values can be fixed throughout the duration of the service or changed at various points during the performance of the service.

In one embodiment, the parameters include a base bandwidth, a full utilization metric (FUM), an adjustment limit. In another embodiment, the parameters also include high-utilization threshold and low-utilization threshold metrics. The base bandwidth and full utilization parameters determine the lower and upper bounds of bandwidth available to a particular service.

The base bandwidth parameter determines the minimum bandwidth to be given the service over the path. The value assigned to this parameter ensures that the service always has bandwidth available, even on links that are used to their bandwidth capacity. Accordingly, the base bandwidth for each service is at least one STS-1.

The full utilization parameter determines the maximum bandwidth allocated to the service (hereafter, the full utilization metric or FUM). The value assigned to this parameter determines the upper limit at which the service can operate. The FUM also operates to establish priority between the services S1 and S2. If the services are to have equal priority, their respective FUMs are assigned equal values (e.g., 24 STS-1s).

Consider, as another example that value for the FUM for the service S1 is 20 STS-1s and the value for the FUM for the service S2 is 24 STS-1s. When a contended link is at overcapacity, the ratio between the FUMs defines the balance between the services on the contended link. Overcapacity, as used herein, means that usage of the contended link is at full bandwidth capacity, and one or both of the contending services are seeking additional bandwidth beyond full capacity. In this example, the services are considered balanced when the service S1 currently has approximately 83% (20/24) of the bandwidth allocated to the service S2. In effect, the FUMs establish a priority between the services S1 and S2. Here, a higher priority is afforded to the service S2 by limiting the service S1 to 83% of the bandwidth of the service S2 when the link is at overcapacity.

The adjustment limit parameter associated with each service, in general, determines when to increase the bandwidth currently allocated to that service. Initially, each service has a minimum allocated bandwidth as determined by the base bandwidth, e.g., one STS-1. Subsequently, the service may be allocated additional bandwidth when the use of its currently allocated bandwidth exceeds a threshold. This threshold is determined by the value assigned to the adjustment limit parameter. If utilization of the currently allocated bandwidth is equal to or greater than the adjustment limit, the NE 10 attempts to increase the current allocation to the service by at least one STS-1 (using LCAS technology). The NE 10 cannot increase the allocation if doing so exceeds the FUM or violates the balance on an overcapacity link. In one embodiment, this adjustment limit is 80%.

Use of the adjustment limit parameter can operate as another mechanism for prioritizing between services. For example, the service S1 can have an adjustment limit of 50%, while the adjustment limit for the service S2 is 80%. Accordingly, STS-1s are more quickly allocated to the service S1 than to the service S2 (provided other factors are equal, such as, that the bandwidth needs of both services are increasing at the same rate).

More specifically, each service S1 and S2 operates (step 112) with its currently allocated bandwidth. Those respective NEs 10 serving as the entry points of each service traffic calculate (step 116) a utilization metric (UM) and a current utilization metric (CUM). To compute the UM, the NE 10-1 (for service S1) averages the number of frames per second (FPS) entering the NE 10-1 over a specified time interval (I). The time interval (I) can be of short duration, e.g., one second, or of long, e.g., 20 minutes to one to two hours, and in one embodiment, is provisionable by the user. This average of frames per second is divided by the maximum number of frames per second (MFPS) that can be transmitted based on the FUM. An equation for computing UM is as follows:

$$UM = FPS/MFPS.$$

Calculation of the CUM entails dividing the FPS (as described above) by the available maximum number of frames per second (AMFPS) that can be transmitted based on the current bandwidth allocation. An equation for computing CUM is as follows:

$$CUM = FPS/AMFPS,$$

where CUM is the current utilization metric, FPS is the frames per second averaged over the time interval I, and the AMFPS is the available maximum number of frames per second based on the currently allocated bandwidth.

If the CUM for a service (S1, for example) is less than the adjustment limit, the current bandwidth allocated to the service remains unchanged. When the CUM exceeds (step 120) the adjustment limit, the NE 10 allocates (step 132) an additional STS-1 to the service if the contended link is not already operating at full capacity (step 124) and if the service has not already reached its permitted maximum bandwidth (step 128) based on its FUM. If the contended link is at overcapacity, the network 2 balances the bandwidth of the link between the services S1 and S2 in accordance with their FUMs. Balance is achieved when the UMs of the services are approximately equal. The network 2 may add STS-1s to or remove STS-1s from each service as appropriate to achieve this balance.

The operation of the adaptive bandwidth management technique of the invention is now described with the use of an example and with reference to FIG. 1. Consider that the contended link 22 has a data speed of 48 STS-1s, that the service S1 has a FUM of 48 STS-1s and a current allocated bandwidth of 27 STS-1s, that the service S2 has a FUM of 48 STS-1s and a current allocated bandwidth of 20 STS-1s, and that an adjustment limit of 80% applies to both services S1, S2. Consider also that the NE 10-1 determines from frames that the service S1 is operating with a current UM of 2.5% and a CUM of 4%, and that the NE 10-2 determines that the service S2 is operating with a current UM of 30% and a CUM of 69%. Neither service S1 nor S2 is operating above its adjustment limit, so no change is made to the bandwidth currently allocated to either service.

Consider then that the CUM of the service S2 increases above 80% to exceed its adjustment limit, while the CUM of the service S1 remains below its adjustment limit. Because the link 22 is not yet operating at full capacity, the NE 10-2 can add another STS-1 to the bandwidth allocated to service S2, increasing the number of allocated STS-1s to 21. This brings the link usage to full capacity (i.e., 48 STS-1s).

Balancing the bandwidth between the services S1 and S2 occurs when the contended link 22 is at full capacity and the CUM of one or both of the services S1 and S2 exceeds the associated adjustment limit. As a result of increasing the allocation to service S2 to 21 STS-1s, as described above, adding another STS-1 to either service cannot occur, without some compensatory adjustment to the current allocations, because the aggregate allocations would exceed the bandwidth capacity of the link 22. Suppose CUM of the service S2 again exceeds 80%. The determination whether to give the service S2 an additional STS-1 depends upon the UMs of the services S1, S2. If the UMs are approximately equal to each other, the bandwidth is already balanced, and the network 2 does not change the current allocation. If the UM of the service S1 is greater than the UM of the service S2, the network 2 does not add the STS-1 to the service S2 (and may remove an STS-1 from the service S2 to equalize the UMs). If instead the UM of service S1 is less than the UM of the service S2, the network adds the STS-1 to the service S2 and removes an STS-1 from the service S1 (further additions of STS-1s to the service S2 and removal of STS-1s may be required to approximately equalize the UMs).

An advantage of the present invention is that it can shift bandwidth between the services, depending upon current bandwidth needs of the services. Suppose that during off-peak hours, traffic of service S1 falls off to almost nothing, whereas the traffic of service S2 increases considerably because of large database backups. In balancing the UMs of the two services S1 and S2, the adaptive bandwidth management technique continues to add STS-1s to the bandwidth allocated to the service S2, while removing STS-1s from the service S1. Ultimately, the base bandwidth of one STS-1 for the service S1 limits the maximum bandwidth that can be allocated to the service S2 to 47 STS-1s, although the FUM of the service S2 is 48 STS-1s.

Some embodiments use high and low utilization threshold metrics. In these embodiments, the ring network 2 can be an event-driven system based on threshold-crossing events. The high-threshold metric (e.g., 90% of current bandwidth allocation) can be used to trigger the addition of bandwidth to a service during the current interval I. Note that bandwidth usage can increase considerably during a long interval (I), such as 10 minutes, which would not be captured until the NE 10 averages the FPS over the full interval. The high-threshold metric enables the network 2 to respond more rapidly to bursty traffic. Similarly, the low utilization metric can be used to trigger the removal of bandwidth from the service should usage of the bandwidth by the service drop below the specified threshold.

In another embodiment, the ring network 2 is a bi-directional ring. Service traffic flows clockwise and counterclockwise around the ring. The adaptive bandwidth management mechanism described above for clockwise communication is also operative in the counterclockwise direction. The ring network 2 adaptively manages shared links in one direction independently of its adaptive management of bandwidth in the opposite direction. The manner of adaptively managing bandwidth in one direction can be the same as or different than the manner of adaptively managing bandwidth in the opposite direction. For instance, the available bandwidth in the clockwise direction can be the same as or different from the available bandwidth in the counterclockwise direction, the values given to the control parameters can be the same as or different from values given these control parameters in the counterclockwise direction, or combinations thereof.

Figure 3:
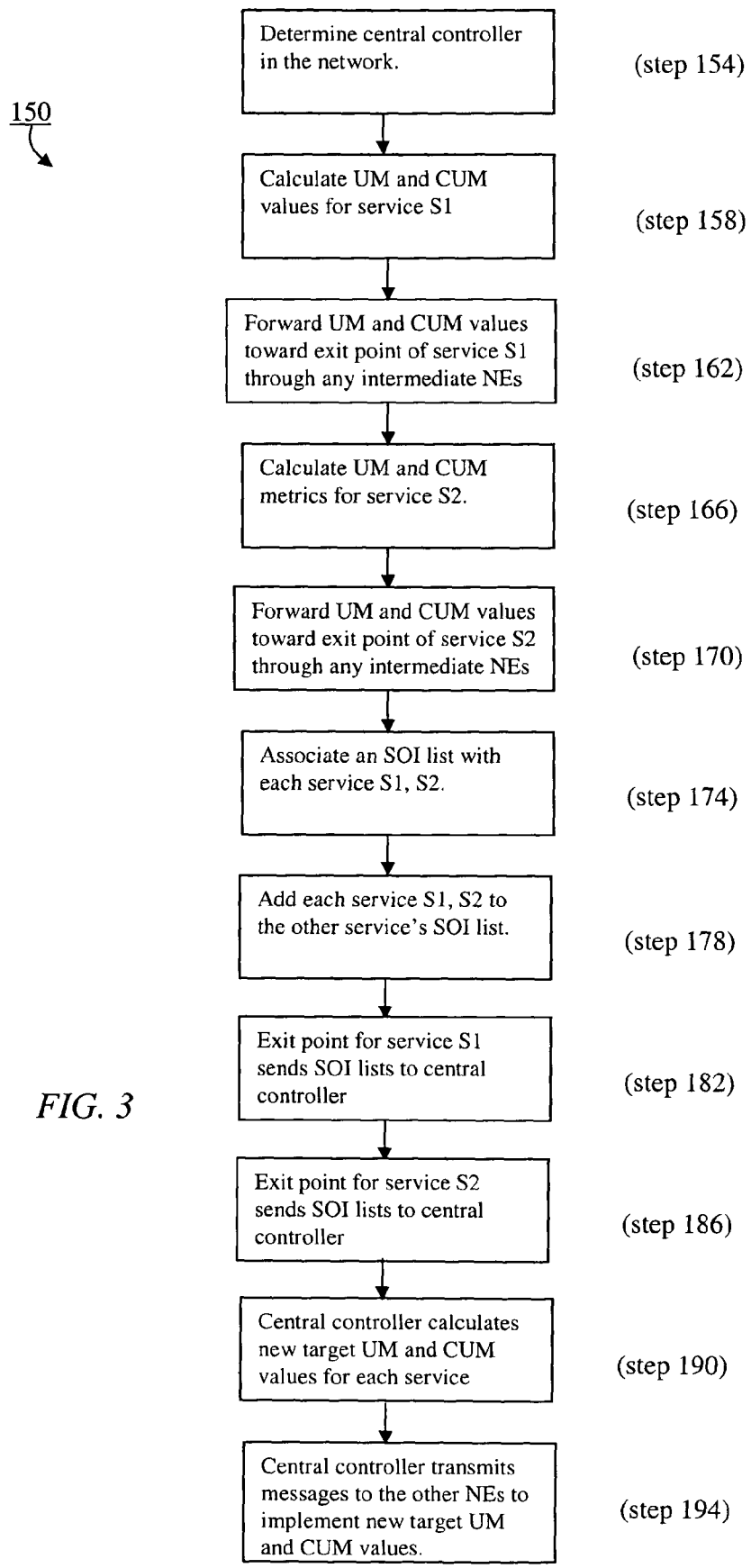
FIG. 3 is a flow diagram of an embodiment of a process for distributing utilization metrics to each network element in the network so that the network elements can cooperate to implement adaptive bandwidth management in accordance with the invention.

FIG. 3 shows an embodiment of a process 150 for enabling the NEs 10 of the network 2 to perform the adaptive bandwidth management process described in FIG. 2. In step 154, one of the NEs 10 becomes a central controller. Any of a variety of techniques can be used to determine the central controller, e.g., using the NE with the lowest media access control (MAC) address. For the purposes of this description, consider that the NE 10-1 is the central controller. In another embodiment, the central controller is another processor-based system external to the network 2 performing the adaptive bandwidth management process.

The NE 10-1 calculates (step 158) the UM and CUM for the service S1 and forwards (step 162) the calculated values to the next NE 10-2 in the ring network 2. The NE 10-2 calculates (step 166) the UM and CUM for the service S2 and forwards (step 170) to the NE 10-3 these calculated values and those calculated values received from the NE 10-1. The NEs 10-1 and 10-2 transmit this information using a channel of the SONET signals, such as unused SONET overhead bytes or bytes of the section data communication channel (SDCC).

A services-of-interest list (SOI) is associated (step 174) with each service. A service is included on an SOI list of another service if the services share a link and the user (e.g., a service provider) indicates that the services are to contend for that link. The SOI lists determine which services are to be adaptively managed as described herein. Services contending for bandwidth on the contended link can be traffic from the same customer or from different customers. In some instances, services share a link, but are not included in each other's SOI list because the service provider does not want the adaptive bandwidth management technique to be operative with respect to these two services. Accordingly, various combinations of adaptively managed services and unmanaged services can concurrently use the same link. For example, two adaptively managed services, such as S1 and S2, can share a portion of the bandwidth of the shared link, the particular allocation of this portion of the bandwidth between these two services being determined by the adaptive bandwidth management technique of the invention, while traffic for a third service S3 uses unshared bandwidth on the same link. That is, the amount of bandwidth available to the third service is independent of the amount of bandwidth collectively used by the services S1 and S2, and unaffected by the bandwidth sharing occurring between services S1 and S2.

At step 176, the NE 10-2 adds the service S1 to the SOI list of the service S2 and the service S2 to the SOI list of the service S1 because the NE 10-2 determines that the two services S1 and S2 are sharing the link 22 and may contend for the link's available bandwidth. The NE 10-2 forwards (step 178) the SOIs to the NE 10-3 with the UM and CUM values.

The NE 10-3 sends (step 182) the SOI associated with the service S1 and the SOI associated with the service S2 and the respective UMs to the central controller (here, NE 10-1), through the NE 10-4. Because the NE 10-3 is the exit point of the traffic for the service S1, the SOI list for service S1 is complete (i.e., there are no other links in the network 2 for which the service S1 can contend against other services). Similarly, the NE 10-4 sends (step 186) the SOI associated with the service S2 and the SOI associated with the service S1, and the respective UMs, to the central controller because the NE 10-4 is the exit point of the traffic for the service S2.

Based on the SOI lists and metric values received, the central controller NE 10-1, calculates (step 190) a new target UM and CUM for each path, and sends (step 194) messages to each of the other NEs to achieve these new targets by balancing bandwidth between the two services as appropriate.

While the invention has been shown and described with reference to specific preferred embodiments, it should be understood by those skilled in the art that various changes in form and detail may be made therein without departing from the spirit and scope of the invention as defined by the following claims. For instance, various other parameters can be employed to control the policy of bandwidth allocation between services contending for links. For example, a second adjustment limit can be used to determine when bandwidth usage has dropped off sufficiently to warrant removing an STS-1 from a service.

What is claimed is:

1. A method of adaptively managing bandwidth among a plurality of services contending for bandwidth on an optical link having a bandwidth capacity, the method comprising:

allocating bandwidth to each service contending for bandwidth of the optical link;

computing for each service a utilization metric representing a measure of current usage of a maximum allowed bandwidth for that service, the utilization metric determined by dividing an average number of frames per second by a maximum number of frames per second allocated to the service;

computing for each service a current utilization metric representing a measure of current usage of the allocated bandwidth by that service; and allocating additional bandwidth to one of the services in response to the current utilization metric of that service if bandwidth usage of the optical link is currently at less than full capacity, otherwise balancing the bandwidth allocation between the services in response to the current utilization metric of at least one of the services if the bandwidth usage of the optical link is currently at full capacity, such that the utilization metrics of the services are made approximately equal to each other.

2. The method of claim 1, wherein each service is a Gigabit Ethernet service.

3. The method of claim 1, further comprising associating an adjustment limit parameter with each service to control when to increase the bandwidth allocated to that service.

4. The method of claim 3, wherein the step of allocating additional bandwidth to one of the services occurs if the current utilization metric exceeds a threshold based on the adjustment limit parameter for that service.

5. The method of claim 1, wherein the additional bandwidth allocated to one of the services is a granularity of an STS-1 path.

6. The method of claim 1, further comprising using Link Capacity Adjustment Schemes (LCAS) technology to allocate additional bandwidth to one or the services when usage of the optical link is at less than full capacity.

7. The method of claim 1, further comprising associating a full utilization metric with each service to determine a maximum bandwidth allocation for each service and a priority between the services to be used when balancing.

8. The method of claim 1, further comprising generating, for each service, a services-of-interest list for identifying one or more services with which that service contends for the bandwidth of the optical link.

9. A method of adaptively managing bandwidth among a plurality of services contending for bandwidth on an optical link having a bandwidth capacity, the method comprising:
   allocating bandwidth to each service contending for bandwidth on the optical link;
   determining for each service a current utilization metric representing a current usage by that service of the bandwidth allocated to that service;
   computing for each service a utilization metric representing a measure of current usage of a maximum allowed bandwidth for that service, the utilization metric determined by dividing an average number of frames per second by a maximum number of frames per second allocated to the service, and
   balancing the bandwidth allocation between the services if the current utilization metric of at least one of the services exceeds a specified threshold and usage of the bandwidth of the optical link is currently at full capacity, such that the utilization metrics of the services are made approximately equal to each other.

10. The method of claim 9, wherein the step of balancing includes removing bandwidth from one of the services and allocating the removed bandwidth to another one of the services.

11. The method of claim 9, further comprising associating an adjustment limit parameter with each service and allocating additional bandwidth to one of the services if the current utilization metric exceeds a threshold based on the adjustment limit parameter for that service and usage of the bandwidth of the optical link is currently less than full capacity.

12. The method of claim 9, further comprising associating a full utilization metric with each service to determine a maximum bandwidth allocation for each service and a priority between the services to be used when balancing.

13. A network, comprising:
   a plurality of network elements connected to each other by optical links;
   a first path for carrying traffic associated with a first service through the network,
   the first path extending through the network over at least one of the optical links;
   a second path for carrying traffic associated with a second service, the second path extending through the network over at least one of the optical links, the second path having a link in common with the first path;
   wherein a first one of the network elements allocates a portion of the bandwidth of the common link to the first service and a second one of the network elements allocates a portion of the bandwidth of the common link to the second service, each of the first and second network elements determining for the first and second services, respectively, a current utilization metric representing a current usage by that service of the bandwidth allocated to that service, each of the first and second network elements determining for the first and second services, respectively, a utilization metric, the utilization metric determined by dividing an average number of frames per second by a maximum number of frames per second allocated to the service, the first and second network elements balancing the bandwidth allocated to the services if the current utilization metric of at least one of the services exceeds a specified threshold and usage of the bandwidth of the common link is currently at full capacity, such that the utilization metrics of the services are made approximately equal to each other.

14. The network of claim 13, further comprising a central controller for sending messages to the network elements that direct the balancing of the bandwidth allocated to the services.

15. The network of claim 13, wherein the network is a ring network.

16. The network of claim 13, wherein the network is a linear network.

17. The network of claim 13, wherein the first and second network elements each maintain a services-of-interest list for identifying one or more services with which that service contends for the bandwidth of the optical link.

* * * * *